Dec. 13, 1966
J. JACIR
3,290,867
APPARATUS FOR COOLING LIQUIDS
Filed Dec. 13, 1963
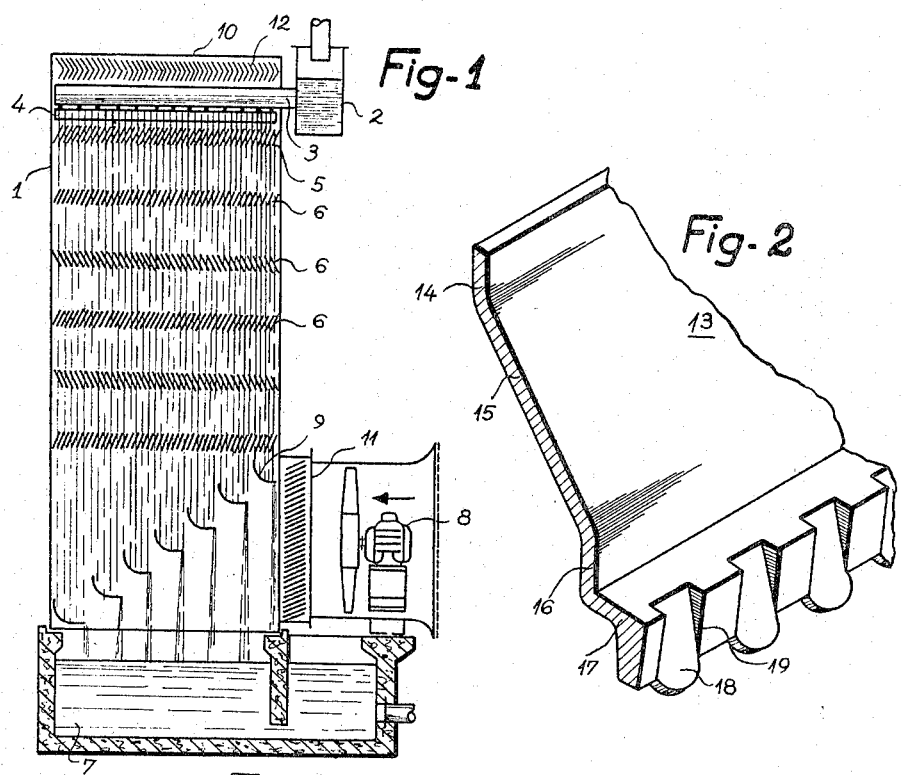
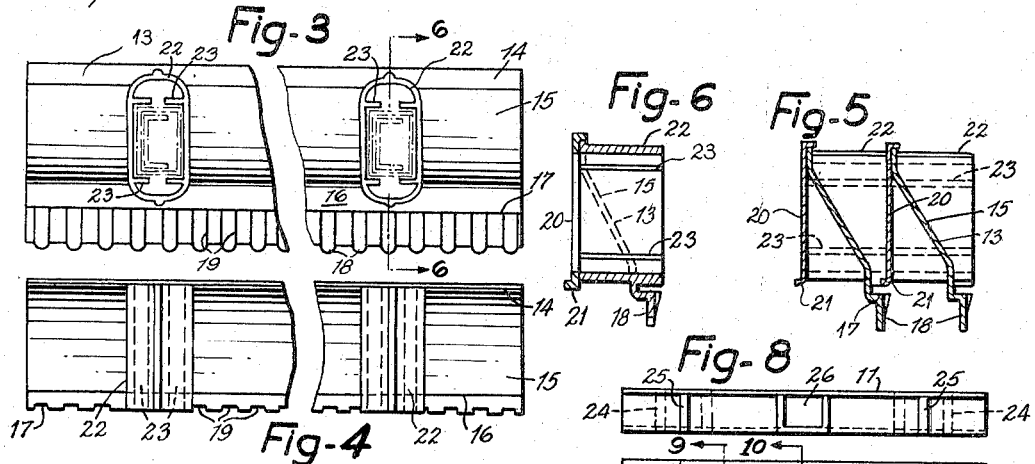
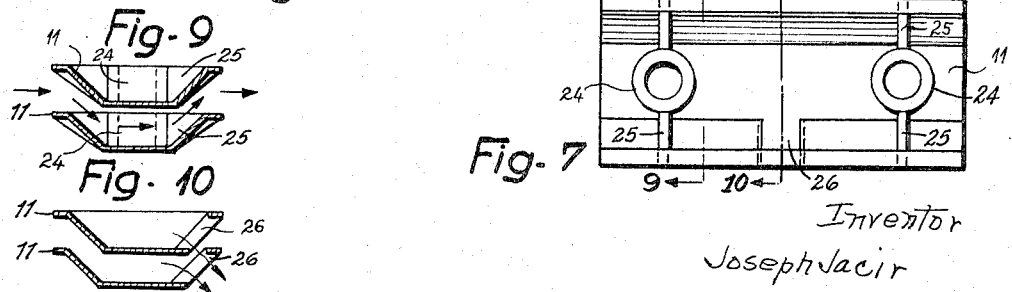
Inventor
Joseph Jacir
By Stevens, Davis, Miller & Mosher
Attorneys 3,290,867
APPARATUS FOR COOLING LIQUIDS
Joseph Jacir, 13 Rue Jean Bachelet,
Neuilly-Plaisance, France
Filed Dec. 13, 1963, Ser. No. 330,381
Claims priority, application France, Dec. 20, 1962,
919,340, Patent 1,351,499
1 Claim. (Cl. 55—258)

Many types of apparatus designed for producing an intimate contact between a liquid fluid falling freely in the form of fine droplets and an ascending counter-current flow of gaseous fluid in order to effect a heat transfer or a physical or chemical exchange therebetween, or a dust removing operation, have already been proposed.

As a rule, these apparatus comprise a distributor device dividing the liquid fluid into streamlets or droplets, this liquid being subsequently delivered by free fall to dispersion stages disposed crosswise, the gaseous fluid stream ascending in counter-current relationship thereto between the planes of fall of the liquid in order to ensure the necessary intimate contact between the two fluids. The liquid droplets are collected in rectifying bladings adapted to straighten the gaseous fluid delivered by a fan mounted in a lateral or branch duct in which separators are interposed, this fluid escaping from the upper portion of the apparatus after flowing through another series of separators.

Up to now the distributor and separator stages of these apparatus consist of pressed parts liable to both mechanical failure and corrosion.

It is the object of the present invention to provide an apparatus adapted, in spite of its relatively low cost, of ensuring, a remarkable efficiency of operation while providing both a large heat-exchange surface area and very low pressure losses in the two fluid circuits.

To this end, the present invention provides on the one hand distributor devices and dispersing devices, and on the other hand droplet separators having a specific configuration permitting on the one hand an efficient separating action and on the other hand an easy mounting, their shape being such that they can easily be obtained by moulding, whereby they can be manufactured from materials other than conventional sheet metal stocks, notably from synthetic resin.

A typical form of embodiment of a cooling apparatus constructed according to the teachings of this invention will be described hereinafter by way of example with reference to the accompanying drawing, in which:

FIGURE 1 is a diagrammatic vertical section and side elevational view of the apparatus;

FIGURE 2 is a fragmentary isometric section showing one of the distributors or dispersing elements of the apparatus having inclined teeth;

FIG. 3 is a front elevational view of a distributor element having vertical teeth;

FIG. 4 is a top plan view of the distributor element shown in FIG. 3;

FIG. 5 is a cross section through two adjacent distributor elements of FIG. 3;

FIG. 6 is a section taken upon the line 6—6 of FIG. 3 through a distributor element;

FIG. 7 is a plan view of a droplet separator element;

FIG. 8 is a side view of a droplet separator element;

FIG. 9 is a sectional view of a droplet separator element, taken along line 9—9 of FIG. 7;

FIG. 10 is a sectional view along line 10—10 of FIG. 7.

In its broadest aspect the heat transfer or exchange apparatus of this invention comprises in the known manner a housing 1 to which the liquid is fed at the top through a main tank 2 or a pipe, this liquid being distributed by means of distributor manifolds or tubes 3 into distributor pans 4 from which it falls by overflow onto the elements of the distributor device proper 5. The liquid thus distributed over the entire horizontal surface area of the apparatus flows in the form of fine droplets through the various dispersion stages 6 and is finally collected at the bottom of the apparatus in a vat 7.

A motor-driven fan unit 8 forces the gaseous fluid stream upwards in counter-current relationship to the liquid flow. This gaseous flow introduced through an inlet or coupling ring at the bottom of housing 1 is straightened by bladings 9 and rises vertically in counter-current relationship to the liquid droplets until it escapes at 10 from the top of the apparatus.

Droplet separators 11 are disposed between the housing 1 and the coupling ring to avoid liquid projections onto the motor-driven fan unit.

Likewise, droplet separators 12 are provided at the top of the apparatus to avoid any discharge of droplets from this end of the apparatus.

A specific feature of this invention resides in the arrangement and shape of the elements constituting the means for distributing and dispersing the liquid, as well as in the mounting thereof another feature residing in the specific shape of the droplet separators.

The distributors 5 and dispersing devices 6 comprise essentially distributor elements 13 in the form of bars having substantially the sectional contour illustrated in FIG. 2. Thus, each element 13 comprises a substantially vertical lip 14, an oblique portion 15, another vertical portion 16 followed by a horizontal ledge 17 and vertical or inclined teeth 18.

The horizontal ledge 17 has notches 19 formed therein and the teeth 18 consist of vertical or inclined faces constituting the bottoms of these notches.

The liquid droplets impinge during their fall against the oblique portion 15 of elements 13 at each stage of the apparatus. The liquid thus collected is again spread over the ledge surface and flows through each notch 19 constituting a distributor channel for each vertical tooth 18 wherefrom the liquid escapes again in the form of gauged droplets.

The distributor stage also comprises similar elements.

The liquid flows over the two side edges of a pan 4 and falls into a chamber bounded by the upper portion of the distributor 13 and by an intermediate partition 20 secured on the adjacent distributor and formed at its lower edge with a lip 21 extending at right angles to the plane of partition 20, as shown notably in FIG. 5. Thus, the liquid falling upon the lip 21 is projected laterally by this lip onto the ledge 17 of the distributor element.

To permit their mounting these distributor elements 13 comprise at either end a tubular or like portion 22 formed with a pair of parallel ribs 23 permitting the passage of a sectional support, preferably covered by a sheath (shown in chain-dotted lines in FIG. 3), or a supporting rod. Thus the various distributor elements are supported on this section or rod.

An improved form of embodiment may comprise for instance a tubular support made from the same material as the distributor element. The distributor assembly is thus supported by a pair of parallel tubes.

Another feature characterizing this invention resides in the specific shape of the droplet separators 11. These separators, as shown in FIGS. 9 and 10 of the drawing, are of dished configuration and carry at their ends like the distributor elements hollow tubular or like extensions 24 constituting convenient passages for sections or supporting tubes; these extensions 24 are formed with radial ribs 25 to prevent the liquid from flowing towards the ends and to return it to the center from which it can flow in troughs 26.

With these elements an apparatus easy to assemble and disassemble is obtained, wherein all the component elements can be replaced very easily although their construction is both easy and economical. Finally, this apparatus has a high efficiency due to the low loss of pressure to which the fluids are subjected.

What is claimed is:

In a liquid-cooling apparatus, in combination, a vertical housing having open upper and lower ends and having a lateral air supply opening adjacent its lower end, means supplying air to the housing through the opening with the air passing upwardly in the housing, means at the open upper end for supplying liquid into the housing, a liquid distribution means arranged transversely in the housing below the upper end, said liquid distribution means including a plurality of liquid distribution elements each of which has an upper vertically disposed portion, a horizontally spaced lower portion parallel to said upper portion, an oblique portion interconnecting said upper and lower portions, a ledge extending outwardly at a right angle from said lower vertical portion, a plurality of notches in said ledge, teeth portions in each of said notches extending beneath said ledge and a partition portion depending from said upper vertical portion and having a lower outwardly extending ledge, means extending through said partition portion and through said oblique portion of each of said elements for mounting said elements in close juxtaposition in said apparatus, droplet separator means at said air supply opening and at the upper end, each said droplet separator comprising an elongated bar-shaped member of dish configuration, means for collecting the liquid retained in said separator at its substantially central portion, means to dispense said collected liquid into the interior of said liquid cooling apparatus, means for mounting said members in spaced relationship within said air supply opening and said open upper end.

References Cited by the Examiner

UNITED STATES PATENTS

| 1,471,112 | 10/1923 | Ellis | 55—258 X |
| 2,915,302 | 12/1959 | Jacir | 261—109 X |
| 2,998,097 | 8/1961 | Baxter | 55—258 |

FOREIGN PATENTS

| 1,138,128 | 6/1957 | France. |
| 1,150,603 | 1/1958 | France. |

ROBERT F. BURNETT, *Primary Examiner.*

HARRY B. THORNTON, *Examiner.*

D. K. DENENBERG, *Assistant Examiner.*